US008005209B2

(12) United States Patent
Joshi et al.

(10) Patent No.: US 8,005,209 B2
(45) Date of Patent: Aug. 23, 2011

(54) INVARIANCE BASED CONCURRENT ERROR DETECTION FOR THE ADVANCED ENCRYPTION STANDARD

(75) Inventors: Nikhil Joshi, Staten Island, NY (US); Ramesh Karri, New York, NY (US)

(73) Assignee: Polytechnic University, Brooklyn, NY (US)

(*) Notice: Subject to any disclaimer, the term of this patent is extended or adjusted under 35 U.S.C. 154(b) by 1167 days.

(21) Appl. No.: 11/327,658

(22) Filed: Jan. 6, 2006

(65) Prior Publication Data

US 2007/0014395 A1    Jan. 18, 2007

Related U.S. Application Data

(60) Provisional application No. 60/641,855, filed on Jan. 6, 2005.

(51) Int. Cl.
| | |
|---|---|
| H04L 9/28 | (2006.01) |
| H04L 9/00 | (2006.01) |
| H04L 9/30 | (2006.01) |
| H04K 1/04 | (2006.01) |
| H04K 1/06 | (2006.01) |
| H04K 1/00 | (2006.01) |

(52) U.S. Cl. ............... 380/28; 380/29; 380/30; 380/36; 380/37; 380/42; 380/255; 380/259; 380/260

(58) Field of Classification Search ............... 380/28, 380/29, 30, 36, 37, 42, 255, 259, 260
See application file for complete search history.

(56) References Cited

U.S. PATENT DOCUMENTS

2002/0051534 A1* 5/2002 Matchett et al. ............ 380/37

OTHER PUBLICATIONS

Breveglieri et al ("Detecting Faults in Four Symmetric Key Block Ciphers", 15th IEEE International Conference on Application-Specific Systems, Architectures and Processors (ASAP'04) ).*
Bertoni et al ("A Parity Code Based Fault Detection for an Implementation of the Award Encryption Standard", 17th IEEE International Symposium on Defect and Fault Tolerance in VLSI (DFT'02).*
Ozev et al., "Cost Effective Concurrent Test Hardware Design for Linear Analog Circuits," ICCD, 2002, 258-264.
Metra et al., "On-Line Testing of Transient Faults Affecting Functional Blocks of FCMOS, Domino and FPGA-Implemented Self-Checking Circuits," DFT, 2002, 207-215.
Boneh et al., "On the importance of checking cryptographic protocols for faults," Proceedings of Eurocrypt, Lecture Notes in Computer Science vol. 1233, 1997, 37-51.
Biham et al., "Differential Fault Analysis of Secret Key Cryptosystems," Proceedings of Crypto, 1997.

(Continued)

*Primary Examiner* — Edan Orgad
*Assistant Examiner* — Jahangir Kabir
(74) *Attorney, Agent, or Firm* — Woodcock Washburn LLP

(57) ABSTRACT

Advanced Encryption Standard (AES) is an encryption algorithm for securing sensitive unclassified material by U.S. Government agencies and, as a consequence the de facto encryption standard for commercial applications worldwide. Performing concurrent error detection (CED) for protection of such a widely deployed algorithm is an issue of paramount importance. We present a low-cost CED method for AES. In this method, we make use of invariance properties of AES to detect errors. For the first time, the invariance properties of the AES, which are for the most part used to attack the algorithm, are being used to protect it from fault attacks. Our preliminary ASIC synthesis of this architecture resulted in an area overhead of 13.8% and a throughput degradation of 16.67%.

18 Claims, 4 Drawing Sheets

OTHER PUBLICATIONS

Bloemer et al., "Fault Based cryptanalysis of the Advanced Encrytpion Standard," www.iacr.org/enrint/2002/075.pdf.

Giraud, "Differntial Fault Analysis on AES," eprint.iacr.org/2003/008.ps.

Piret et al., "A Differential Fault Attack Technique against SPN structures, with Application to the AES and KHAZAD," CHES, 2003, Springer Verlag LNCS 2779.

Daemen et al., "AES proposal: Rijndael," Advanced Enryption Standard (AES), csrc.nist.gov/CryptoTooklit/aes/rijndael/, 2001.

Karri et al., "Concurrent Error Detection of Fault Based Side-Channel Cryptanalysis of 128-Bit Symmetric Block Ciphers," IEEE Transactions on CAD, 2002.

Bertoni et al., "Error Analysis and Detection Procedures for a Hardware Implementation of the Advanced Encryption Standard," IEEE Transactions on Computers, 52(4), 492-505, Apr. 20.

Bertoni et al., "On the propagation of faults and their detection in a hardware implementation of the advanced encryption standard," Proceedings of ASAP'02, 2002, 303-312.

Makris et al., "Invariance-Based On-Line Test for RTL Controller-Datapath Circuits," VTS, 2000.

Desmedt et al., "Cyclic Properties of AES round Functions," Invited Talk, 4th Conference on the AES, 2004.

Tri Van Le, "Novel Cyclic Properties of AES," http://eprint.iacr.org/2003/108/.

Karri et al., "Parity-Based Concurrent Error Detection of Substitution-Permutation Network Block Ciphers," CHES, 2003, Springer Verlang LNCS 2779.

* cited by examiner

PRIOR ART

INVARIANCE BASED CONCURRENT ERROR DETECTION FOR THE ADVANCED ENCRYPTION STANDARD

§0. PRIORITY CLAIM

Benefit is claimed, under 35 U.S.C. §119(e)(1), to the filing date of U.S. provisional patent application Ser. No. 60/641,855 (referred to as "the '855 provisional"), titled "INVARIANCE BASED CONCURRENT ERROR DETECTION FOR THE ADVANCED ENCRYPTION STANDARD", filed on Jan. 6, 2005, and listing Nikhil Joshi and Ramesh Karri as the inventors, for any inventions disclosed in the manner provided by 35 U.S.C. §112, ¶1. The '855 provisional application is expressly incorporated herein by reference. The scope of the present invention is not limited to any requirements of the specific embodiments described in the '855 provisional application.

§1. BACKGROUND OF THE INVENTION

§1.1 Field of the Invention

The present invention concerns encryption, such as encryption using the Advanced Encryption Standard. In particular, the present invention concerns detecting errors in encryption operations.

§1.2 Background Information

Faults that occur in VLSI chips can broadly be classified into two categories: Transient faults that die away after sometime and permanent faults that do not die away with time but remain until they are repaired or the faulty component is replaced. The origin of these faults could be due to the internal phenomena in the system such as threshold change, shorts, opens etc. or due to external influences like electromagnetic radiation. These faults affect the memory as well as the combinational parts of a circuit and can only be detected using Concurrent Error Detection (CED). (See, e.g., S. Ozev, A. Orailoglu, "Cost-Effective Concurrent Test Hardware Design for Linear Analog Circuits" ICCD 2002, pp 258-264; and C. Metra, S. Francescantonio, G. Marrale, "On-Line Testing of Transient Faults Affecting Functional Blocks of FCMOS, Domino and FPGA-Implemented Self-Checking Circuits" DFT 2002 pp. 207-215, both incorporated herein by reference.) This is especially true for sensitive devices such as cryptographic chips. Hence, CED for cryptographic chips is growing in importance. Since cryptographic chips are a consumer product produced in large quantities, cheap solutions for CED are needed. CED for cryptographic chips has also a great potential for detecting deliberate fault injection attacks where faults are injected into a cryptographic chip to break the key. (See, e.g., D. Boneh, R. DeMillo and R. Lipton, "On the importance of checking cryptographic protocols for faults", *Proceedings of Eurocrypt*, Lecture Notes in Computer Science vol 1233, Springer-Verlag, pp. 37-51, 1997; E. Biham and A. Shamir, "Differential Fault Analysis of Secret Key Cryptosystems", *Proceedings of Crypto*, August 1997; J. Bloemer and J.-P. Seifert, "Fault based cryptanalysis of the Advanced Encryption Standard," www.iacr.org/eprint/2002/075.pdf; Giraud, "Differential Fault Analysis on AES", eprint.iacr.org/2003/008.ps; and G. Piret, J-J. Quisquater, "A Differential Fault Attack Technique against SPN Structures, with Application to the AES and KHAZAD," CHES 2003, Springer Verlag LNCS 2779, each incorporated by reference.)

The most straightforward methods of performing CED are Hardware Redundancy and Time Redundancy. In Hardware Redundancy, multiple ($\geq 2$) copies of the algorithm are used concurrently to perform the same computation on the same data. At the end of each computation, the results are compared and any discrepancy is reported as an error. The advantage of this technique is that it has minimum error detection latency and both transient and permanent faults are detected. A drawback of this technique is that it entails $\geq 100\%$ hardware overhead. In Time Redundancy, the same basic hardware is used to perform both the normal and re-computation using the same input data. The advantage of this technique is that it uses minimum hardware but the drawback is that it entails $\geq 100\%$ time overhead. Also, another significant shortcoming is that it can only detect transient faults.

In 2001, Advanced Encryption Standard (AES) (See J. Daemen and V. Rijmen, "AES proposal: Rijndael", csrc.nist.gov/CryptoToolkit/aes/rijndael/; incorporated herein by reference) was chosen as the FIPS standard to be a royalty-free encryption algorithm for use worldwide and offer security of a sufficient level to protect data for the next 20 to 30 years. Since then, it has been the most widely used, analyzed and attacked crypto algorithm. Differential Fault Attacks have been a popular method to attacks AES implementations and many CED techniques have been proposed to thwart such attacks. (See, e.g., J. Bloemer and J.-P. Seifert, "Fault based cryptanalysis of the Advanced Encryption Standard," www.iacr.org/eprint/2002/075.pdf; Giraud, "Differential Fault Analysis on AES", eprint.iacr.org /2003/008.ps; and G. Piret, J-J. Quisquater, "A Differential Fault Attack Technique against SPN Structures, with Application to the AES and KHAZAD," *CHES* 2003, Springer Verlag LNCS 2779.) In the paper, R Karri, K. Wu, P. Mishra and Y. Kim, "Concurrent Error Detection of Fault Based Side-Channel Cryptanalysis of 128-Bit Symmetric Block Ciphers," *IEEE Transactions on CAD*, December 2002 (incorporated herein by reference), a Register Transfer Level CED approach for AES that exploits the inverse relationship between the encryption and decryption at the algorithm level, round level and individual operation level was developed. This technique has an area overhead of 21% at the algorithm level, 18.9% at the round level and 38.08% at operation level.

Similarly, the time overhead is 61.15%, 26.55% and 23.56% respectively. In the paper G. Bertoni, L. Breveglieri, I. Koren and V. Piuri, "On the propagation of faults and their detection in a hardware implementation of the advanced encryption standard," *Proceedings of ASAP* '02, pp. 303-312, 2002 (incorporated herein by reference), this inverse-relationship technique was extended to AES round key generation. A drawback of this approach is that it assumes that the AES crypto device operates in a half-duplex mode (i.e. either encryption or decryption but not both are simultaneously active).

In the paper G. Bertoni, L. Breveglieri, I. Koren, and V. Piuri, "Error Analysis and Detection Procedures for a Hardware Implementation of the Advanced Encryption Standard," *IEEE Transactions on Computers*, vol. 52, No. 4, pp. 492-505, April 20 (incorporated herein by reference) a parity-based CED method for the AES encryption algorithm was presented. This technique has relatively high hardware overhead. The technique adds one additional parity bit per byte resulting in 16 additional bits for the 128-bit data stream. Each of the sixteen 8-bit×8-bit AES s-boxes is modified into 9-bit×9-bit S-Boxes more than duplicating the hardware for implementing the s-boxes. In addition, this technique adds one additional parity bit per byte to the outputs of the Mix-Column operation because Mix-Column does not preserve parity of its inputs at the byte-level. In this paper, we propose a time redundancy based CED technique for the AES which entails a low time overhead and can detect both transient and permanent faults. It makes use of invariances exhibited by AES. Invariances have been previously used for online testing. (See, e.g., Y. Makris, I. Bayraktaroglu, A. Orailoglu, "Invariance-Based On-Line Test for RTL Controller-Datapath Circuits" VTS 2000, incorporated herein by reference.)

§1.2.1 Advanced Encryption Standard

AES (J. Daemen and V. Rijmen, "AES proposal: Rijndael", csrc.nist.gov/CryptoToolkit/aes/rijndael/) is an iterative block cipher with a variable block length. In this paper, we will consider a block length of 128 bits. AES encrypts a 128-bit input plain text into a 128-bit output cipher text using a user key using 10 almost identical iterative rounds. The 128-bit (or 16-byte) input and the 128-bit (or 16-byte) intermediate results are organized as a 4x4 matrix of bytes called the state X.

$$X = \begin{bmatrix} x_0 & x_4 & x_8 & x_{12} \\ x_1 & x_5 & x_9 & x_{13} \\ x_2 & x_6 & x_{10} & x_{14} \\ x_3 & x_7 & x_{11} & x_{15} \end{bmatrix}$$

The four four-byte groups (x0, x4, x8, x12), (x1, x5, x9, x13), (x2, x6, x10, x14) and (x3, x7, x11, x15) form the four rows of the state (matrix) X.

AES encryption is shown in FIG. 1. It consists of the operations ByteSub, ShiftRow, MixColumn, and AddRoundKey. In the last round the MixColumn operation is not used.

§1.2.1.1 ByteSub Operations

All bytes are processed separately. For every byte not equal to 0=(0,0,0,0,0,0,0,0) first the inverse in GF(28) is determined. $m(x)=s^8+x^4+x+1$ is used as the modular polynomial for $GF(2^8)$. The byte 0 is mapped to 0. Then a linear affine transformation is applied. Very often ByteSub is implemented using 16 copies of an 8-bit×8-bit Substitution-Box (S-Box). The result state is:

$$Y = \begin{bmatrix} y_0 & y_4 & y_8 & y_{12} \\ y_1 & y_5 & y_9 & y_{13} \\ y_2 & y_6 & y_{10} & y_{14} \\ y_3 & y_7 & y_{11} & y_{15} \end{bmatrix}$$

§1.2.1.2 ShiftRow Operations

The rows of the state are shifted cyclically byte-wise using a different offset for each row. Row 0 is not shifted, row 1 is cyclically shifted left 1 byte, row 2 is cyclically shifted left by 2 bytes and row 3 is cyclically shifted left 3 bytes. The result state is represented as Z:

$$Z = \begin{bmatrix} z_0 & z_4 & z_8 & z_{12} \\ z_1 & z_5 & z_9 & z_{13} \\ z_2 & z_6 & z_{10} & z_{14} \\ z_3 & z_7 & z_{11} & z_{15} \end{bmatrix} = \begin{bmatrix} y_0 & y_4 & y_8 & y_{12} \\ y_5 & y_9 & y_{13} & y_1 \\ y_{10} & y_{14} & y_2 & y_6 \\ y_{15} & y_3 & y_7 & y_{11} \end{bmatrix}$$

§1.2.1.3 MixColumn Operations

The elements of the columns of the state are considered as the coefficients of polynomials of maximal degree 3. The coefficients are considered as elements of $GF(2^8)$. These polynomials are multiplied modulo the polynomial $x^4+1$ with a fixed polynomial $c(x)=(03)x^3+(01)x^2+(01)x+(02)$. The coefficients of this polynomial given in hexadecimal representation are also elements of $GF(2^8)$. The MixColumn operation on a column $z^r=[z_0,z_1,z_2,z_3]^T$ of the state into the column $u^T=[u_0,u_1,u_2,u_3]^T$ can be formally described by Equation (1) where the constant elements of the matrix C and of the vectors $z^T$ and $u^T$ as well as the multiplication and the addition are in $GF(2^8)$. The polynomial $x=x^8+x^4+x+1$ is used as the modular polynomial. The elements of matrix C are 01, 02 and 03.

$$\begin{bmatrix} u_0 \\ u_1 \\ u_2 \\ u_3 \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \times \begin{bmatrix} z_0 \\ z_1 \\ z_2 \\ z_3 \end{bmatrix} \quad (1)$$

The MixColumn operation can be implemented by a simple linear network of exclusive or elements.

§1.2.1.4 AddRoundKey Operations

AddRoundKey operation is a bit-wise exclusive-or of the 128-bit round key (matrix K) with the 128-bit state. The result state is:

$$A = \begin{bmatrix} u_0 & u_4 & u_8 & u_{12} \\ u_1 & u_5 & u_9 & u_{13} \\ u_2 & u_6 & u_{10} & u_{14} \\ u_3 & u_7 & u_{11} & u_{15} \end{bmatrix} \oplus \begin{bmatrix} k_0 & k_4 & k_8 & k_{12} \\ k_1 & k_5 & k_9 & k_{13} \\ k_2 & k_6 & k_{10} & k_{14} \\ k_3 & k_7 & k_{11} & k_{15} \end{bmatrix}$$

§1.2.1.5 Invariance Properties of AES

Desmedt, Le, Sparr and Wemsdorf (See, e.g., Y. Desmedt, T. Le, R. Sparr, R. Wemsdorf, "Cyclic Properties of AES round Functions", Invited Talk, 4th Conference on the AES, May 2004; and Tri Van Le "Novel Cyclic Properties of AES", http://eprint.iacr.org/2003/108/, both incorporated herein by reference.) discovered that AES exhibits invariance properties. AES round can be represented as A[RKi](M(S(B(p)))) where p is the 128-bit input to the round, B is the ByteSub operation, S is the ShiftRow operation, M is the MixColumn operation and A[RKi] is the AddRoundKey operation as defined in section-2.

Consider a part of the AES round as shown in FIG. 2 where the results are observed at the output of the MixColumn function. From the 128-bit input to the round, each input byte passes through an S-Box in the ByteSub function. The resulting 128-bit ByteSub output then passes through the ShiftRow and MixColumn functions. Consider w, x, y, z, a, b, c and d to be byte quantities. From the results in Y. Desmedt, T. Le, R. Sparr, R. Wemsdorf, "Cyclic Properties of AES round Functions", Invited Talk, 4th Conference on the AES, May 2004; and Tri Van Le "Novel Cyclic Properties of AES", http://eprint.iacr.org/2003/108/:

$$M(S(B(\{w,w,w,w,w,w,w,w,w,w,w,w,w,w,w,w\}))) = \{a,a,a, a,a,a,a,a,a,a,a,a,a,a,a,a\} \quad (2)$$

$$M(S(B(\{w,x,w,x,w,x,w,x,w,x,w,x,w,x,w,x\}))) = \{a,b,a,b,a, b,a,b,a,b,a,b,a,b,a,b\} \quad (3)$$

$$M(S(B(\{w,x,y,z,w,x,y,z,w,x,y,z,w,x,y,z\}))) = \{a,b,c,d,a,b, c,d,a,b,c,d,a,b,c,d\} \quad (4)$$

$$M(S(B(\{w,x,w,x,y,z,y,z,w,x,w,x,y,z,y,z\}))) = \{a,b,a,b,c,d, c,d,a,b,a,b,c,d,c,d\} \quad (5)$$

$$M(S(B(\{w,x,y,z,y,z,w,x,w,x,y,z,y,z,w,x\}))) = \{a,b,c,d,c,d, a,b,a,b,c,d,c,d,a,b\} \quad (6)$$

These invariance properties of AES are being used to investigate its weaknesses.

§2. SUMMARY OF THE INVENTION

Embodiments consistent with the present invention may be used to strengthen the hardware implementations of AES and to protect it against fault attacks using these very invariance properties. For example, embodiments consistent with the present invention may be used to detect advanced encryption standard errors or errors in symmetric block ciphers which have an AddRoundKey function by (a) inserting the first CED round C1 in between any of the 10 rounds of the AES with inputs {0x7E, 0x7E . . . , 0x7E} to the ByteSub function; (b) applying inputs {0x7E, 0x7E . . . , 0x7E} and {0x7E, 0x7E . . . , 0x7E} to the AddRoundKey function; (c) determining if the output of the MixColumn and AddRoundKey functions are equal to {0xF3, 0xF3 . . . , 0xF3} and {0x00, 0x00, . . . , 0x00}, respectively; and (d) if it is determined that the output of the MixColumn and AddRoundKey functions are not equal to {0xF3, 0xF3 . . . , 0xF3} and {0x00, 0x00, . . . , 0x00}, respectively, then performing a first error responsive operation. Embodiments consistent with the present invention may further perform acts of (e) inserting the second CED round C2 anywhere after C1 with inputs {0x81, 0x8 . . . , 0x81} to the ByteSub function; (f) applying inputs {0x7E, 0x7E . . . , 0x7E} and {0x81, 0x81 . . . , 0x81} to the AddRoundKey function; (g) determining if the output of the MixColumn and AddRoundKey functions are equal to {0x0C, 0x0C . . . , 0x0C} and {0xFF, 0xFF . . . , 0xFF}, respectively; and (h) if it is determined that the output of the MixColumn and AddRoundKey functions are not equal to {0x0C, 0x0C . . . , 0x0C} and {0xFF, 0xFF . . . , 0xFF} respectively, then performing a second error responsive operation.

§3. BRIEF DESCRIPTION OF THE DRAWINGS

§4. DETAILED DESCRIPTION

Figure 1:
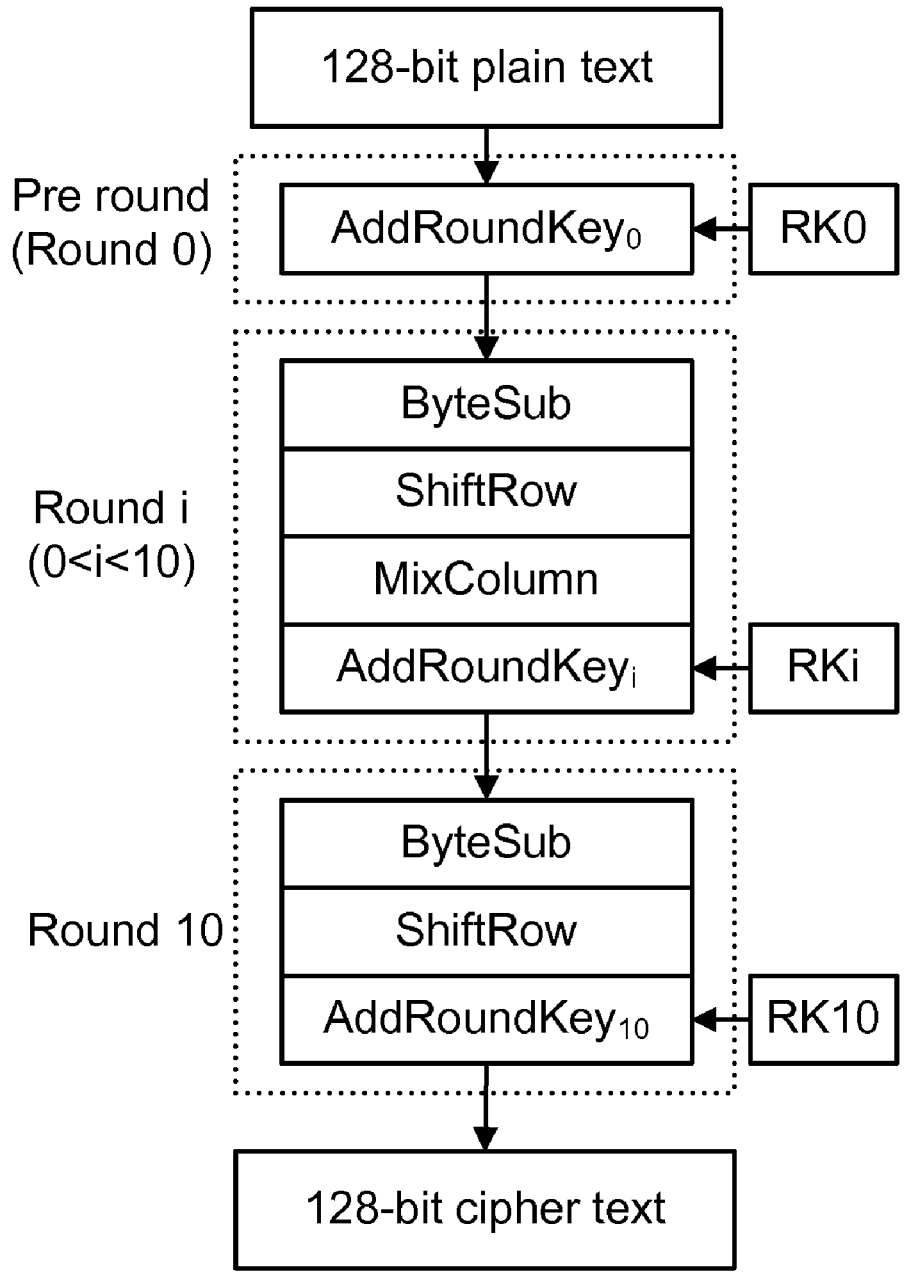
FIG. 1 is a block diagram illustrating operations in the Advanced Encryption Standard.
Figure 2:
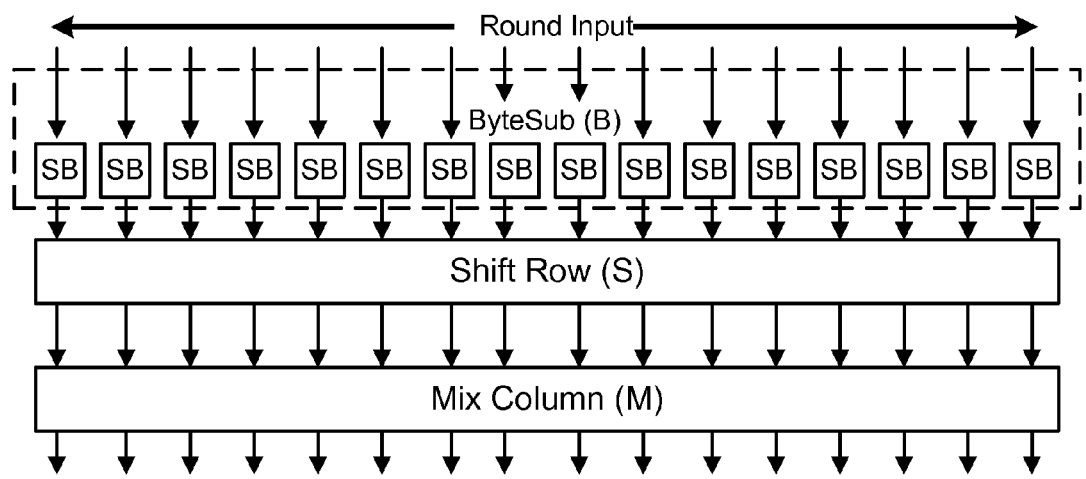
FIG. 2 illustrates ByteSub, Shift Row and Mix Column operations in a round of the Advanced Encryption Standard.

The present invention may involve novel methods, apparatus, message formats, and/or data structures for detecting errors in encryption operations. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

§4.1 Invariance Based CED

We will show how these invariances can be used for CED in a non-pipelined AES architecture. Since symmetric block ciphers are frequently used in one of three feedback modes: Cipher Block Chaining (CBC), Output FeedBack (OFB) and Cipher FeedBack (CFB), a non-pipelined architecture is indeed appropriate. The proposed scheme works even in a non-feedback Electronic Code Book (ECB) mode.

Theorem: When the inputs to the ByteSub function are applied according to equation (2), the ShiftRow and MixColumn functions have no effect; rather, the outputs of the ByteSub function are reflected at the output of the MixColumn function.

Proof: The ShiftRow function just changes the order of the bytes and in this case, since all bytes are identical, the output of the shift row function is B(w,w, . . . w,w)⇒{SB(w), SB(w) . . . SB(w), SB(w)}, where SB(w) is the output of an S-Box on input byte w. If all 16 input bytes to the MixColumn operation are identical, then all 16 output bytes are the same as the input bytes. This can be proved as follows. For the MixColumn operation, if the inputs are applied according to equation (2), equation (1) will be changed to $$\begin{bmatrix} u_0 \\ u_1 \\ u_2 \\ u_3 \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \times \begin{bmatrix} SB(w) \\ SB(w) \\ SB(w) \\ SB(w) \end{bmatrix}$$

Since the operations performed are in $GF(2^8)$, $u_0 = 02 * SB(w) \oplus 03 * SB(w) \oplus 01 * SB(w) \oplus 01 * SB(w) = SB(w)$ $u_1 = 01 * SB(w) \oplus 02 * SB(w) \oplus 03 * SB(w) \oplus 01 * SB(w) = SB(w)$ $u_2 = 01 * SB(w) \oplus 01 * SB(w) \oplus 02 * SB(w) \oplus 03 * SB(w) = SB(w)$ $u_3 = 03 * SB(w) \oplus 01 * SB(w) \oplus 01 * SB(w) \oplus 02 * SB(w) = SB(w) \Rightarrow u_0 = u_1 = u_2 = u_3 = SB(w)$ The invariance shown in equation (2) can be used to check for stuck-at faults in the ByteSub, ShiftRow and MixColumn functions by applying an input according to equation (2) i.e., {w,w,w,w,w,w,w,w,w,w,w,w,w,w,w,w} and checking for equivalence of adjacent bytes at the MixColumn output during an extra inserted "CED round" in the encryption operation. But performing just this will not detect all faults in the ByteSub, ShiftRow and MixColumn functions. This is because all the test cases are not covered. For example, if a stuck-at-1 fault exists at the output of one of the bits of MixColumn and the value of SB(w) during the CED round at that bit is '1', the fault will go undetected. Hence only ≦50% fault coverage is obtained. This prompts us to use two CED rounds to cover all test cases. Choosing a random pair of values as inputs to equation (2) during the two CED rounds also may not cover all test cases since the output at a particular bit may be the same during both the CED rounds. In order to find the best pair of values for the two CED rounds, we performed analysis and made a crucial observation regarding the fault detection capability of the 8-bit×8-bit AES S-Box:

SB(01111110)=1111 0011†

SB(10000001)=00001100‡

†$(011\ 1110)_2 = 0x7E, (1111\ 0011)_2 = 0xF3$

‡$(1000\ 0001)_2 = 0x81, (0000\ 1100)_2 = 0x0C$

On closer observation, we can see that the above pair of inputs and outputs are exact complements of each other. According to equation (2), we see that if we apply {0x7E, 0x7E . . . , 0x7E} and its complement {0x81, 0x81 . . . , 0x81} as inputs, complementary values {0xF3, 0xF3 . . . , 0xF3} and {0x0C, 0x0C . . . 0x0C} pass through the ByteSub, ShiftRow and MixColumn functions.

Since the exact complementary bits pass through, addition of two extra rounds in the AES datapath with the above two inputs enables us to detect any error that may be present by comparing adjacent output bytes.

The above technique enables us to detect the faults only in the ByteSub, ShiftRow and MixColumn functions of the AES datapath. Faults in the AddRoundKey function can be detected by using the inherent property of exclusive-or function: exclusive-or of two identical bit-streams yields all 0's and exclusive-or of two complementary bit-streams yields all 1's. Since we already use a pair of complementary values as inputs to rounds C1 and C2, during the first CED round, {0x7E, 0x7E, 0x7E} is ex-ored with {0x7E, 0x7E, 0x7E}. A result of all 0's is obtained if there are no stuck-at-1 faults. If any bit in the output is '1', it indicates the presence of a stuck-at-1 fault. During the second CED round, {0x7E, 0x7E, 0x7E} is ex-ored with {0x81, 0x81, 0x81}. A result of all 1's is obtained if there are no stuck-at-0 faults. If any bit in the output is '0', it indicates the presence of a stuck-at-0 fault.

Figure 3:
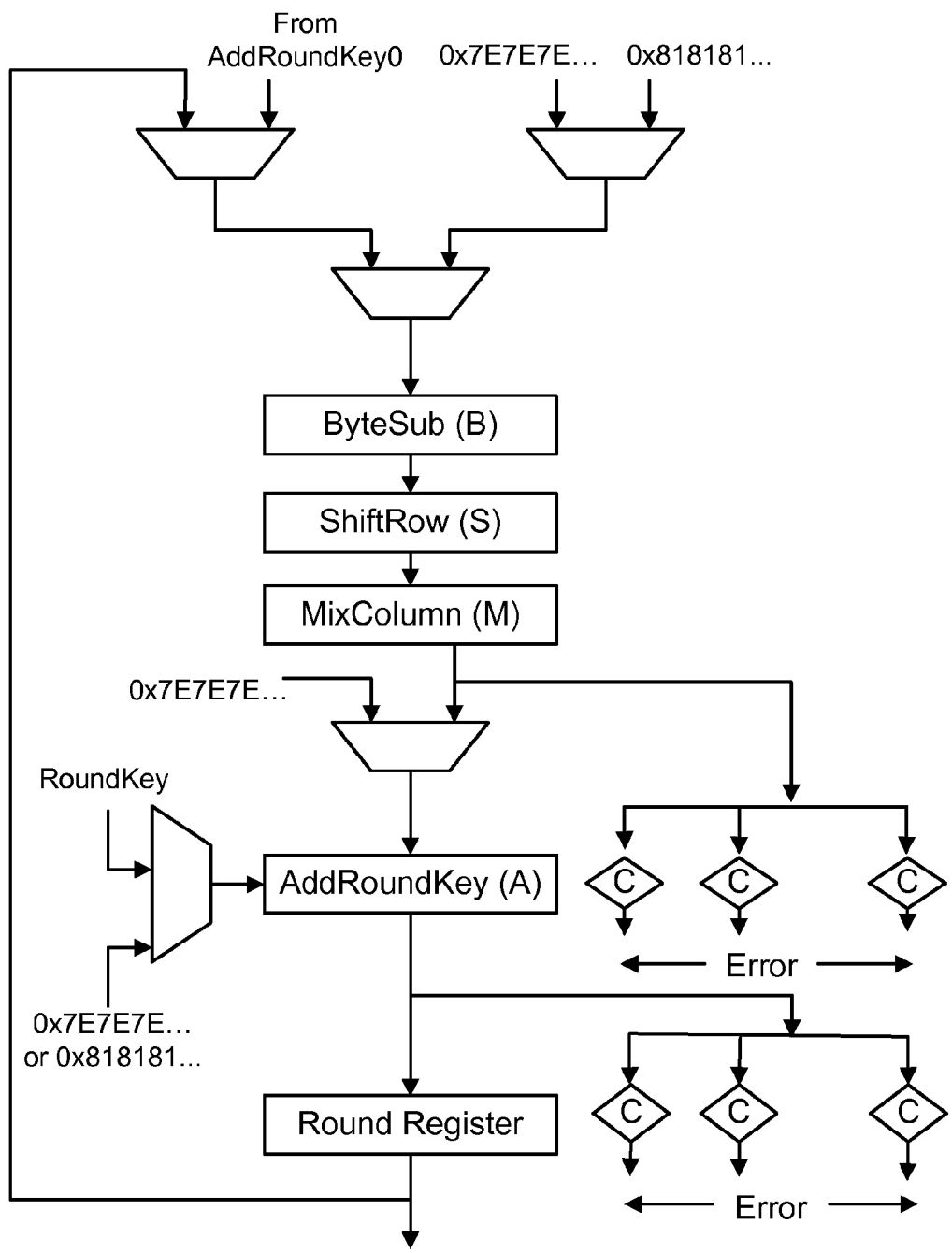
FIG. 3 is a block diagram illustrating an error detection scheme, consistent with the present invention, used in association with a round of the Advanced Encryption Standard.

The normal AES datapath is modified as shown in FIG. 3 to incorporate the proposed CED method. Overall, the CED technique can be summarized as follows:

(i) Insert the first CED round C1 in between any of the 10 rounds of the AES with inputs {0x7E, 0x7E . . . 0x7E} to the ByteSub function. Concurrently apply inputs {0x7E, 0x7E . . . , 0x7E} and {0x7E, 0x7E . . . , 0x7E} to the AddRoundKey function.

(ii) Perform byte-wise comparison to check if the output of the MixColumn and AddRoundKey functions are equal to {0xF3, 0xF3 . . . , 0xF3} and {0x00, 0x00 . . . , 0x00} respectively. If not, an error is reported, the outputs are suppressed and encryption is halted.

(iii) Insert the second CED round C2 anywhere after C1 with inputs {0x8,x8 . . . , 0x81} to the ByteSub function. Concurrently, apply inputs {0x7E, 0x7E . . . , 0x7E} and {0x81, 0x81 . . . , 0x81} to the AddRoundKey function.

(iv) Perform byte-wise comparison to check if the output of the MixColumn and AddRoundKey functions are equal to {0x0C, 0x0C . . . , 0x0C} and {0xFF, 0xFF, . . . , 0xFF} respectively. If not, an error is reported, the outputs are suppressed and the encryption is halted.

§4.2 Fault Detection Capability

§4.2.1 Single-Bit Faults

The proposed CED technique enables us to detect all single-bit and multiple-bit permanent faults in the AES datapath at the expense of two extra CED rounds C1 and C2. In order to evaluate the error detection capability of the proposed CED scheme, the CED architecture was modeled in C++. Single-bit stuck-at faults (both stuck-at-0 and stuck-at-1) were injected at all points in the design, for every input used for testing. This was accomplished by adding a multiplexer with a fault injection control at the point of the fault insertion.

A stuck-at-1 fault is injected at a point by setting the fault injection control to 1 and similarly, a stuck-at-0 fault is injected at a point by setting the fault injection control to 0. Single-bit faults were inserted not only at the input and output of the modules, but also inside them. In the fault simulation the lowest level of fault injection was performed at the inputs and outputs of the exclusive-or gates. The number of single-bit faults is shown in Table 1. For example, since the ByteSub function of consists of 16 S-Boxes, each with an 8-bit input and an 8-bit output, the total number of single-bit faults is 512. Simulations were performed for 1.5 million random inputs, and for every input all the possible single-bit permanent faults were simulated and encryption was performed. Table 1 shows the fault coverage obtained.

TABLE 1

Single-bit fault coverage

| Layer | # of single bit faults | # of inputs applied | Fault coverage |
|---|---|---|---|
| B | 512 | 1500000 | 100% |
| S | 512 | 1500000 | 100% |
| M | 3072 | 1500000 | 100% |
| A | 768 | 1500000 | 100% |

As seen from the table, the invariance based CED technique can detect all single-bit permanent faults.

§4.2.1 Multiple-Bit Faults

Since it was not feasible to inject every possible combination of multiple bit faults, we injected multiple-bit faults randomly into the system. It was observed that the fault coverage was 100% for multiple-bit permanent faults. This is possible because the expected results of both CED rounds C1 and C2 are known (16 bytes of 0xF3 and 16 bytes of 0x0C resp.) and since byte-wise comparison of the CED round outputs is performed against these known bytes in the proposed technique, all multiple faults are detected.

§4.3 Protection Against Known Fault Attacks

Most of the fault attacks on the AES rely on deliberately injecting either bit or byte faults in the datapath during the last few round(s) of encryption. (See, e.g., Giraud, "Differential Fault Analysis on AES", eprint.iacr.org/2003/008.ps; and G. Piret, J-J. Quisquater, "A Differential Fault Attack Technique against SPN Structures, with Application to the AES and KHAZAD," *CHES* 2003, Springer Verlag LNCS 2779.) These fault attacks can be detected by strategically inserting the CED rounds C1 and C2 in the AES datapath. As an example, if C1 is inserted before the second-to-last round and C2 is inserted after the last round, the attacks that insert faults in the last few round(s) can be countered.

Blomer and Seifert (J. Bloemer and J.-P. Seifert, "Fault based cryptanalysis of the Advanced Encryption Standard," www.iacr.org/eprint/2002/075.pdf) proposed a simple fault attack on the AES. They apply an all 0s plaintext and insert a one-bit fault at the output of the AddRoundKey0 at a time. This attack does not use the faulty ciphertext to recover the key. The round-key0 can be recovered by inserting a fault and checking if this fault is detected at the output. If an inserted fault is not detected, the inserted fault has the same value as the key bit at that position. If it is not detected, inserted fault has the opposite value to that of the value of the key bit at that position. If the fault is detected and some re-computation scheme is added in the circuit to redo the encryption to give the correct output, the extra time taken to perform encryption is enough information to deduce the key bit at that position. This simple yet powerful attack is applicable not only to AES, but all symmetric block ciphers which have an AddRoundKey function as their first round-operation. These facts imply that key recovery can be done even on AES implementations which incorporate all previously proposed fault detection techniques (See, e.g., R Karri, K. Wu, P. Mishra and Y. Kim, "Concurrent Error Detection of Fault Based Side-Channel Cryptanalysis of 128-Bit Symmetric Block Ciphers," *IEEE Transactions on CAD*, December 2002; R. Karri, G. Kuznetsov and M. Goessel, "Parity-based Concurrent Error Detection of Substitution-Permutation Network Block Ciphers," *CHES* 2003, Springer Verlag LNCS 2779; G. Bertoni, L. Breveglieri, I. Koren and V. Piuri, "On the propagation of faults and their detection in a hardware implementation of the advanced encryption standard," *Proceedings of ASAP '02*, pp. 303-312, 2002; and G. Bertoni, L. Breveglieri, I. Koren, and V. Piuri, "Error Analysis and Detection Procedures for a Hardware Implementation of the Advanced Encryption Standard," *IEEE Transactions on Computers*, vol. 52, No. 4, pp. 492-505, April 20, each incorporated herein by reference.) The invariance based CED technique proposed above can be adapted in order to thwart Blomer and Seifert's attack as follows: After AddroundKey0 is performed, the result is stored. After this, C1 and C2 are performed on the AddRoundKey0 function. i.e., {0x7E, 0x7E . . . , 0x7E} is ex-ored with {0x7E, 0x7E . . . , 0x7E} during C1 and {0x7E, 0x7E . . . , 0x7E} is ex-ored with {0x81, 0x81 . . . , 0x81} during C2. After C1, the output is checked for {0x00, 0x00, . . . , 0x00} and after C2, the output is checked for {0xFF, 0xFF, . . . , 0xFF}. This can identify the existence of faults in the function and if faults exist, the output is suppressed. This information is not enough for the attacker to determine the key since in this case, the fault is detected even if the inserted fault-bit (stuck at 0 or 1) is the same as the key bit at that position. Also, since these two CED rounds are performed each time encryption is performed regardless of existence of a fault, the timing attack is not successful. Further, the CED method just explained to thwart Blomer and Seifert's attack can be used not only with AES but with all symmetric block ciphers which have an AddRoundKey function as their first round-operation.

§4.4 Protection Against Future Fault Attacks

Figure 4:
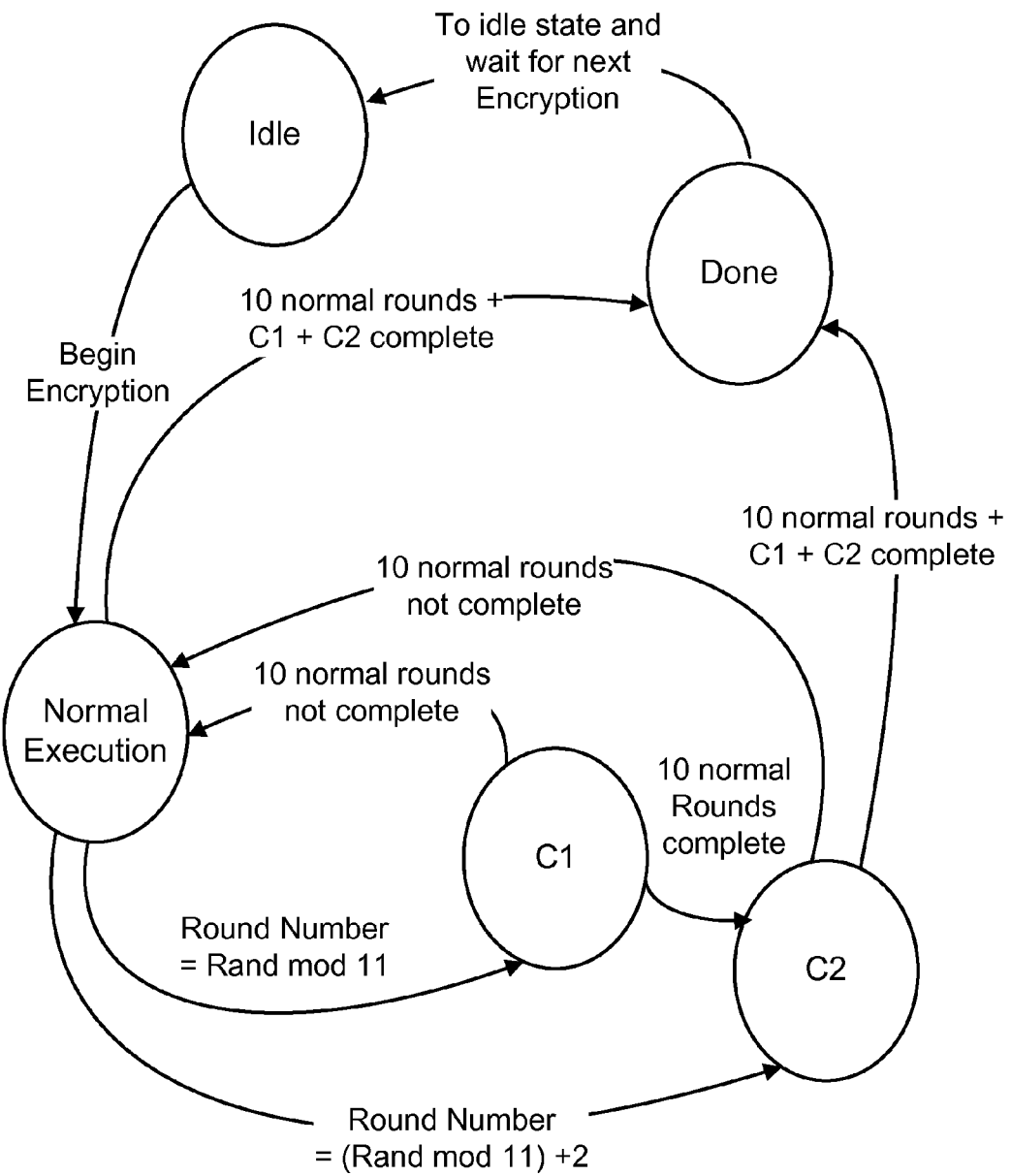
FIG. 4 illustrates a state machine diagram for a random concurrent error detection round insertion operation consistent with the present invention.

The proposed CED technique can detect all faults except transient faults which do not manifest during the CED rounds C1 and C2. If an attacker determines the architecture of the AES with the proposed CED implementation, this feature can be used as a weakness to insert faults in such a way that they do not exist during the CED rounds but only during the normal rounds. To prevent this, we propose to use a technique called "Random CED Round Insertion" (RCRI). In this method, the positions of the CED rounds C1 and C2 are random during the 10 round AES encryption process for every encryption operation performed. This can be achieved by means of a random number (Rand), and can be implemented as shown in the state diagram of FIG. 4.

This random number can be obtained using the randomness property of the AES algorithm. For example, a Rand register can be incorporated in to the circuit with some random number stored in it at manufacture time and for every subsequent encryption performed, the resulting ciphertext can be ex-ored with Rand. As shown in the figure, when an encryption is to be performed, the algorithm enters the normal execution state. Normal encryption rounds are performed until the value of the Rand modulo 11 equals the round number. Once this condition is satisfied, the CED round C1 is performed. Depending on whether 10 normal rounds have been performed, either C2 or the remaining normal rounds are performed. The encryption process is complete when 10 normal rounds and the randomly inserted C1 and C2 CED rounds are complete.

§4.5 Implementation Based Validation

AES datapath with the proposed CED was implemented using IBM 0.13 micron library. The architecture was modeled using VHDL, and Cadence Buildgates PKS system was used for synthesis and place route. The normal design without CED was implemented using the same library and design flow. Table 2 shows the details of the overheads for CED architecture of compared to the normal implementation. The second row shows the area used by the designs. An inverter of this library takes 32 units area. The area overhead of the CED design is 13.8%. The third row shows the minimum clock periods of synthesized designs. Due to the extra hardware inserted in the datapath, the clock period of CED design is 3.3% more than the normal designs. The fourth row shows that the CED design takes two more clock cycles compared to the normal design. This is because of the two CED rounds C1 and C2 inserted in the CED design. Finally the throughputs comparisons are shown in the fifth row. The throughput is calculated as the number of bits encrypted per second, i.e. the # of text/(the # of clock cycles×clock period).

TABLE 2

Overhead for the CED implementation

| | Normal | CED | Overhead (%) |
|---|---|---|---|
| Area | 148087 | 168603 | 13.8 |
| Clock (ps) | 8770.6 | 9060.32 | 3.3 |
| #clock cycles | 11 | 13 | 18.2 |
| Thr'put (Gbps) | 1.32 | 1.1 | 16.67 |

§4.6 Conclusions

Almost all devices incorporating security features like smart cards, SSL off loaders, VPN devices etc use hardware implementations of AES. Hence CED for AES implementations is a topic of utmost importance. In this paper, a new low cost CED technique for AES that detects both single and multiple-bit faults was proposed which exploits the invariances exhibited by AES. A novel method of randomly inserting CED rounds was also proposed. The proposed technique entails an area overhead of 13.8% and degrades the throughput by less than 17%. The AES round key generation algorithm expands the 128-bit user key into 11 128-bit round keys. The functions used in the round key expansion are the S-Box and the exclusive-or function. Hence, the CED method proposed in this paper can be used to detect faults in the key expansion algorithm as well. The CED technique proposed to thwart Blomer and Seifert's attack can be used not only with AES but with all symmetric block ciphers which have an AddRoundKey function as their first round-operation.

The present invention is not limited to the specific embodiments described. For example, although an ASIC implementation was described, the present invention can be practiced with other hardware and/or software (e.g., a microprocessor executing program instructions, where the program instructions are stored and/or received from another source).

What is claimed is:

1. A method for detecting errors during encryption by an encryptor device that employs an advanced encryption standard (AES) to transform an input block of data from clear text to cipher text wherein the encryptor device performs a plurality of rounds in which each round successively transforms the input block of data, the method comprising:

performing a first concurrent error detection (CED) round in between any of the plurality of rounds of the AES wherein data input to a byte substitution (ByteSub) function is a first repeating pattern of bytes;

performing an AddRoundKey function with two sets of input data set to the first repeating pattern of bytes;

determining if the data output from a MixColumn function is a plurality of bytes each equal to a first predetermined value and the output from the AddRoundKey function is a plurality of bytes each equal to a second predefined value; and performing a first error responsive operation if it is determined that the plurality of bytes output of the MixColumn and AddRoundKey functions are not equal to the first and second predefined values, respectively.

2. The method of claim 1 wherein the act of applying inputs to the AddRoundKey function is performed concurrently with the act of performing the first CED round in between any of the plurality of rounds of the AES.

3. The method of claim 1 wherein the act of determining if the bytes output from the MixColumn and AddRoundKey functions are each equal to the first and second predefined values respectively includes performing a byte-wise comparison.

4. The method of claim 1 wherein the first error responsive operation includes reporting an error.

5. The method of claim 1 wherein the first error responsive operation includes suppressing an output.

6. The method of claim 1 wherein the first error responsive operation includes halting encryption.

7. The method of claim 1 further comprising:

performing a second CED round anywhere after the first CED round wherein the data input to the ByteSub function comprise a plurality of bytes set to a second repeating pattern of bytes;

performing the AddRoundKey function with one set of input data comprising a plurality of bytes having a pattern equal to the first repeating pattern of bytes and another set of input data comprising a plurality of bytes having a pattern equal to the second repeating pattern of bytes, wherein the second repeating pattern of bytes is a complement of the first repeating pattern of bytes; and performing a second error responsive operation if it is determined that the bytes output from the MixColumn and AddRoundKey functions are not equal to the first and second predefined values respectively.

8. The method of claim 7 wherein the act of performing the AddRoundKey function is performed concurrently with the act of inserting the second CED round.

9. The method of claim 7 wherein the act of determining the output of the MixColumn and AddRoundKey functions includes performing a byte-wise comparison.

10. The method of claim 7 wherein the second error responsive operation includes reporting an error.

11. The method of claim 7 wherein the second error responsive operation includes suppressing an output.

12. The method of claim 7 wherein the second error responsive operation includes halting encryption.

13. The method of claim 7 wherein the first repeating pattern of bytes is 0x81.

14. The method of claim 1 wherein the first repeating pattern of bytes is 0x7E.

15. The method of claim 1 wherein the first and second predefined values comprise 0x0C and 0xFF, respectively.

16. The method as recited in claim 1 wherein the encryptor device is at least partially formed in a chip.

17. An apparatus for detecting errors during encryption by an encryptor that employs an advanced encryption standard (AES) to transform an input block of data from clear text to cipher text wherein the encryptor performs a plurality of rounds in which each round successively transforms the input block of data, the apparatus comprising:

means for performing a first CED round in between any of the plurality of rounds of the AES with byte inputs to a ByteSub function set to 0x7E;

means for performing an AddRoundKey function with bytes set to 0x7E;

means for determining if the bytes output from a MixColumn function are equal to 0xF3 and an AddRoundKey function are equal to 0x00; and means for performing a first error responsive operation if it is determined that the bytes output from the MixColumn and AddRoundKey functions are not equal to 0xF3 and 0x00, respectively.

18. The apparatus of claim 17 further comprising:

means for performing a second CED round after the first CED round with byte inputs set to 0x81 to the ByteSub function;

means for performing the AddRoundKey function with bytes set to 0x7E and 0x81; and means for performing a second error responsive operation if it is determined that the output of the MixColumn and AddRoundKey functions are not equal to 0x0C and 0xFF, respectively.

* * * * *

UNITED STATES PATENT AND TRADEMARK OFFICE
CERTIFICATE OF CORRECTION

PATENT NO. : 8,005,209 B2
APPLICATION NO. : 11/327658
DATED : August 23, 2011
INVENTOR(S) : Joshi et al.

It is certified that error appears in the above-identified patent and that said Letters Patent is hereby corrected as shown below:

Title Page 2, item (56), under "Other Publications", Line 2, delete "Encrytpion" and insert -- Encryption --.

Title Page 2, item (56), under "Other Publications", Line 3, delete ""Differntial" and insert -- "Differential --.

Title Page 2, item (56), under "Other Publications", Line 8, delete "Enryption" and insert -- Encryption --.

Title Page 2, item (56), under "Other Publications", Line 15, delete "Verlang" and insert -- Verlag --.

Signed and Sealed this
Twenty-eighth Day of February, 2012

David J. Kappos
*Director of the United States Patent and Trademark Office*